United States Patent [19]
Gerry

[11] 3,832,566
[45] Aug. 27, 1974

[54] DISTORTIONLESS MAGNETIC LOGIC ELEMENTS

[76] Inventor: Martin E. Gerry, 13452 Winthrope St., Santa Ana, Calif. 92705

[22] Filed: Mar. 23, 1971

[21] Appl. No.: 127,313

Related U.S. Application Data

[60] Division of Ser. No. 840,121, June 19, 1969, Pat. No. 3,651,282, which is a continuation-in-part of Ser. No. 599,335, July 19, 1965, Pat. No. 3,504,229.

[52] U.S. Cl. .................... 307/88 LC, 340/174 CT, 340/174 AG

[51] Int. Cl. .................... H03k 19/16

[58] Field of Search .......... 307/88 LC; 340/174 CT, 340/174 AG, 174.1 F; 179/100.2 C

[56] References Cited

UNITED STATES PATENTS

| | | | |
|---|---|---|---|
| 3,079,593 | 2/1963 | Abbott et al. | 307/88 LC |
| 3,235,744 | 2/1966 | Webb | 307/88 LC |
| 3,479,659 | 11/1969 | Chedoker et al. | 340/174 AG |
| 3,524,991 | 8/1970 | Peslier | 307/88 LC |

*Primary Examiner*—Stanley M. Urynowicz, Jr.

[57] ABSTRACT

The principles and use of magnetic main core flux and ways for eliminating mutual flux components contributing to distortion in a group of magnetic devices results in these magnetic devices having better operating results and hence contributes to better and higher fidelity products. Included are components such as logic gates. A basic ternary or three-state logic element is disclosed with distortion-free properties and its use in computer applications enables a large reduction of the number of logic gates along with faster computation time in view of the fact that counting is done by three instead of the conventional two in digital computers. The freedom from distortion in the logic gates enhances pulse handling ability, reduces the quantity of wave shape restoration components needed in equipment wherever used, and enables a greater amount of information to be stored in a smaller amount of space on a recording medium in view of the freedom from distortion components, which actually use up a large portion of the frequency spectrum and hence recording space.

20 Claims, 21 Drawing Figures

COMBINATIONS FOR $v_z=0$

| VARIABLE | 1 | 2 | 3 |
|---|---|---|---|
| $v_{x1}$ | 0 | 0 | 1 |
| $v_{x2}$ | 0 | 1 | 0 |

COMBINATIONS FOR $v_z=1$

| VARIABLE | 1 |
|---|---|
| $v_{x1}$ | 1 |
| $v_{x2}$ | 1 |

COMBINATIONS FOR $v_z=0$

| VARIABLE | 1 |
|---|---|
| $v_x$ | 0 |
| $v_y$ | 0 |

COMBINATIONS FOR $v_z=1$

| VARIABLE | 1 | 2 | 3 |
|---|---|---|---|
| $v_x$ | 0 | 1 | 1 |
| $v_y$ | 1 | 0 | 1 |

COMBINATIONS FOR $v_z = 0$

| VARIABLE | 1 | 2 | 3 |
|---|---|---|---|
| $v_{x1}$ | 0 | 0 | 1 |
| $v_{x2}$ | 0 | 1 | 0 |
| $v_y$ | 0 | 0 | 0 |

COMBINATIONS FOR $v_z = 1$

| VARIABLE | 1 | 2 | 3 | 4 | 5 |
|---|---|---|---|---|---|
| $v_{x1}$ | 0 | 0 | 1 | 1 | 1 |
| $v_{x2}$ | 0 | 1 | 0 | 1 | 1 |
| $v_y$ | 1 | 1 | 1 | 0 | 1 |

COMBINATIONS FOR $V_z = 0$

| VARIABLE | 1 | 2 | 3 | 4 | 5 | 6 | 7 |
|---|---|---|---|---|---|---|---|
| $V_{x1}$ | 0 | 0 | 0 | +1 | −1 | +1 | −1 |
| $V_{x2}$ | 0 | +1 | −1 | 0 | 0 | −1 | +1 |

COMBINATIONS FOR $V_z = +1$

| VARIABLE | 1 |
|---|---|
| $V_{x1}$ | +1 |
| $V_{x2}$ | +1 |

COMBINATIONS FOR $V_z = -1$

| VARIABLE | 1 |
|---|---|
| $V_{x1}$ | −1 |
| $V_{x2}$ | −1 |

COMBINATIONS FOR $v_z = 0$

| VARIABLE | 1 | 2 | 3 |
|---|---|---|---|
| $v_x$ | 0 | +1 | −1 |
| $v_y$ | 0 | −1 | +1 |

COMBINATIONS FOR $v_z = +1$

| VARIABLE | 1 | 2 | 3 |
|---|---|---|---|
| $v_x$ | 0 | +1 | +1 |
| $v_y$ | +1 | 0 | +1 |

COMBINATIONS FOR $v_z = -1$

| VARIABLE | 1 | 2 | 3 |
|---|---|---|---|
| $v_x$ | 0 | −1 | −1 |
| $v_y$ | −1 | 0 | −1 |

COMBINATIONS FOR $v_z = 0$

| VARIABLE | 1 | 2 | 3 | 4 | 5 | 6 | 7 | 8 | 9 |
|---|---|---|---|---|---|---|---|---|---|
| $v_{x1}$ | 0 | 0 | 0 | +1 | −1 | +1 | −1 | +1 | −1 |
| $v_{x2}$ | 0 | +1 | −1 | 0 | 0 | −1 | +1 | +1 | −1 |
| $v_y$ | 0 | 0 | 0 | 0 | 0 | 0 | 0 | −1 | +1 |

COMBINATIONS FOR $v_z = +1$

| VARIABLE | 1 | 2 | 3 | 4 | 5 | 6 | 7 | 8 | 9 |
|---|---|---|---|---|---|---|---|---|---|
| $v_{x1}$ | 0 | 0 | 0 | +1 | −1 | +1 | +1 | −1 | +1 |
| $v_{x2}$ | 0 | +1 | −1 | 0 | 0 | +1 | −1 | +1 | +1 |
| $v_y$ | +1 | +1 | +1 | +1 | +1 | 0 | +1 | +1 | +1 |

COMBINATIONS FOR $v_z = -1$

| VARIABLE | 1 | 2 | 3 | 4 | 5 | 6 | 7 | 8 | 9 |
|---|---|---|---|---|---|---|---|---|---|
| $v_{x1}$ | 0 | 0 | 0 | +1 | −1 | −1 | +1 | −1 | −1 |
| $v_{x2}$ | 0 | −1 | −1 | 0 | 0 | −1 | −1 | +1 | −1 |
| $v_y$ | −1 | −1 | −1 | −1 | −1 | 0 | −1 | −1 | −1 |

COMBINATIONS FOR $v_z = 1$

| VARIABLE | 1 | 2 | 3 | 4 |
|---|---|---|---|---|
| $v_{x1}$ | 0 | 1 | 1 | 1 |
| $v_{x2}$ | 1 | 0 | 1 | 1 |
| $v_{x3}$ | 1 | 1 | 0 | 1 |

COMBINATIONS FOR $v_z = 0$

| VARIABLE | 1 | 2 | 3 | 4 |
|---|---|---|---|---|
| $v_{x1}$ | 0 | 0 | 1 | 0 |
| $v_{x2}$ | 0 | 0 | 0 | 1 |
| $v_{x3}$ | 0 | 1 | 0 | 0 |

COMBINATIONS FOR $v_{z} = 0$

| VARIABLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $v_{x1}$ | 0 | 0 | 0 | +1 | 0 | 0 | -1 | +1 | 0 | -1 | -1 | 0 | +1 | +1 | -1 | +1 | -1 | +1 | -1 |
| $v_{x2}$ | 0 | 0 | +1 | 0 | 0 | -1 | 0 | -1 | +1 | 0 | +1 | -1 | 0 | +1 | +1 | -1 | -1 | -1 | +1 |
| $v_{x3}$ | 0 | +1 | 0 | 0 | -1 | 0 | 0 | 0 | -1 | +1 | 0 | +1 | -1 | -1 | +1 | +1 | +1 | -1 | -1 |

COMBINATIONS FOR $v_{z} = +1$

| VARIABLE | 1 | 2 | 3 | 4 |
|---|---|---|---|---|
| $v_{x1}$ | 0 | +1 | +1 | +1 |
| $v_{x2}$ | +1 | 0 | +1 | +1 |
| $v_{x3}$ | +1 | +1 | 0 | +1 |

COMBINATIONS FOR $v_{z} = -1$

| VARIABLE | 1 | 2 | 3 | 4 |
|---|---|---|---|---|
| $v_{x1}$ | 0 | -1 | -1 | -1 |
| $v_{x2}$ | -1 | 0 | -1 | -1 |
| $v_{x3}$ | -1 | -1 | 0 | -1 |

DISTORTIONLESS MAGNETIC LOGIC ELEMENTS

PRIOR PARENT APPLICATIONS

This invention is a division of application Ser. No. 840,121, filed June 19, 1969 copending therewith. Application Ser. No. 840,121 is a continuation-in-part and copended with application Ser. No. 599,335, filed July 19, 1965, now U.S. Pat. No. 3,504,229. Application Ser. No. 840,121 is now U.S. Pat. No. 3,651,282.

INCORPORATION BY REFERENCE

Parts of the specification and drawings of application Ser. No. 840,121, aforesaid, is incorporated herein by reference, incorporating such parts of the specification and related accompanying drawings referred to therein, such parts being entitled, "Amplitude Modulation in a Magnetic Structure with Analysis of Distortion Components," and "Transient Behavior of the Magnetic Element."

BACKGROUND OF THE INVENTION

This invention relates to the field of magnetic components such as magnetic logic elements, treating phase and frequency distortion therein, the causes, and the criteria for elimination of these undesireable effects and in a novel basic ternary magnetic logic element.

Related prior art in this field is mostly found in recording and reproducing magnetic heads, particularly the so-called flux responsive heads, the theories applying equally to the magnetic logic elements and all magnetic components.

U.S. Pat. No. 2,855,464 issued Oct. 7, 1958 for an Electromagnetic Head, discusses a number of configurations of flux responsive heads. All heads utilize many windings in complex arrangements, and attempt to obtain flux responsive characteristics by balanced windings. The heads also utilize means for saturating small portions of the magnetic cores.

U.S. Pat. No. 2,704,789 issued Mar. 22, 1955 for a Multi-Channel Flux Responsive Magnetic Reproducer Head Unit, shows a separate core on which is wound a coil for providing high frequency excitation current for creating a changing flux. The separate core used therefor intersects perpendicularly the core structure of the head. The excitation or separate core is attached to a group of individual cores on which signal coils are wound. The basic principle involved is the establishment of orthogonal relationships between the high frequency flux and the signal flux. This relationship results in permeability change at the point of intersection of the two cores, which alledgedly prevents a voltage resulting from the high frequency excitation current from appearing across each recording gap of the individual cores.

U.S. Pat. No. 2,804,506 issued Aug. 27, 1957 for a Dynamagnetic Pick-Up System, which like U.S. Pat. No. 2,855,464, has complex windings within the core structure proper, obtained by drilling or stamping out holes in the flat portion of the core for the purpose of winding a coil about a narrow core portion, so that a small area of the core may have its reluctance changed according to the excitation frequency as well as magnetically saturating that small core area.

U.S. Pat. No. 2,165,307 issued July 11, 1939 for a Means for Translating Magnetic Variations into Electric Variations, utilizes a magnetic core as an integral part of an electron beam tube. A gap in the magnetic circuit external to the beam tube picks off a signal from a tape which is translated in the gap. The magnetic flux path which acts as a deflecting means of the electron beam, terminates at one end of the beam tube within the vicinity of the beam. The voltage output from the tube which is thereby produced is proportional to the flux amplitude of the flux within the gap in which the tape is translated.

All configurations of prior art do not attempt in their explanations, to find the basic reasons for the presence of distortion components of the modulated signal. Consequently, the prior art has not taught ways and means of establishing the basic relationships of the physical parameters constituting a distortion-free magnetic core structure. In view of lack of sufficient basic investigation, and in an attempt at minimizing recording surface area, prior art magnetic components become complex from both mechanical and electrical considerations, yet fail to eliminate or even minimize phase and frequency distortion resulting in their outputs.

Further disadvantages of prior art as related to magnetic logic components has resulted in limitation of the use of magnetic components due to the slow speed of counting, due to the comparatively large quantity of components required, and due to the unreliability of the magnetic component by virtue of the distortion content therein and unfavorable transient response characteristics to pulse-type signals.

In addition of failing to decrease the distortion parameters in the magnetic components, magnetic components utilized as logic gates have large negative transients in their output circuits. Negative transients are those portions of the electrical output signal preventing dependable operation of these circuits, that cross the zero axis and have electrical polarities opposite to the polarities of the desired signal, preventing reliable operation of the logic gate. When used as such a gate, negative transients produced in the process of recording or reproducing signals, contribute to amplitude as well as other undesired distortion phenomena.

Further disadvantages are due to the fact that a large quantity of magnetic tape or recording surface area is required for logic pulse recording. This situation also is disadvantageous in attempting to pulse-pack signals in computer applications where recording space allocations are frequently small, thereby limiting information transmission speed, storage and retrieval and processing of information.

Still further disadvantages in recording intelligence magnetically are due to the prevalent high distortion character of the wave being recorded, necessitating wave shaping circuits, filters and the like.

SUMMARY OF THE INVENTION

It is therefore an objective of this invention to investigate and teach the true reason for the presence of phase and frequency distortion in magnetic components.

It is another objective of this invention to establish ways and means and criteria for proper magnetic core structuring, and forsimplifying magnetic components at the same time, and for virtually eliminating distortion components therein.

It is a further objective of this invention to eliminate negative transients and to avoid the need for wave shaping or waveform restoration circuits.

It is still a further objective of this invention to improve the reliability of operation of the magnetic logic gate.

It is another objective of this invention to avoid amplitude distortion by elimination of negative transient response characteristics in magnetic logic elements.

It is still another objective of the invention to minimize the quantity of magnetic means required for recording computer signals, and to provide for more efficient use of the magnetic surface areas, increase the capability of packing large quantities of pulses in small amount of space thereby improving information transmission speed, storage, retrieval and processing by computers.

It is yet a further objective of this invention to process intelligence magnetically without attendant wave distortion thereby making it unnecessary to add additional wave shaping circuits and filters for restoration of the wave shape of the original signals.

It is still a further objective of this invention to provide an increase in counting speed of the magnetic logic components of a computer by providing a ternary method of counting, thereby decreasing the quantity of components used and increasing the speed of computation by virtually 33.3 percent.

It is another objective of this invention to make magnetic logic computations practical by the overall increase in reliability, by the reduction of components required, by the increase in computation speed, by the increase in fidelity of pulse reproduction, by the increase in pulse packing capability, by the decrease in recording area required, by the decrease in wave shape restoration circuitry required, and by elimination of distortion in the recorded signal.

Briefly, this invention relates to magnetically responsive basic elements such as logic gates. The invention delves into the important and basic phenomena of mutual flux component effects upon flux responsive or modulation-type magnetic heads, and includes magnetic computer components. This is primarily due to the fact that the discovery of the undesired contributions made by the mutual flux components, due to the presence of high mutual inductances is found in the expansion of the non-linear terms of the infinite series characterizing magnetic modulation.

Such high mutual inductances are defined in U.S. Pat. No. 3,651,282 that has been incorporated by reference, to be a function of the coefficient of coupling, and it has been shown in U.S. Pat. No. 3,651,282 that a desired range of coefficient of coupling is a finite value greater than 0 but less than 0.9.

It was realized from this development that the undesired phase and frequency distortion components resided in the mutual flux components, and it was further realized that creating multiple magnetic discontinuities within the core structure could essentially eliminate these undesired components, substantially without attentuation of the desired signal; this in clear opposition to the concepts expounded in the prior art.

The points of novelty residing in this invention include firstly a means of successfully controlling and minimizing mutual flux components in the magnetic structure, which are created by interaction of main core fluxes circulating therein. This is basically achieved by having multiple magnetic discontinuities of the core structure, achievable in a number of different ways. The conclusion derived, not only gives the parameters upon which control is required, but also gives quantitative measures of these parameters so that the degree of minimizing of the undesired distortion components may be predicted from the physical dimensions of the magnetic core structure. The results which lead to freedom from phase and frequency distortion are directly applicable to a group of magnetic species consisting of a binary logic element, a ternary logic element and logic NOT element as well as combinations derived from these species. Another point of novelty is the creation of the basic ternary logic element, referred to as one of the species. The magnetic discontinuities interposed in the core structure provides a means for minimizing undesirable mutual flux components within the magnetic core structure. Analysis also shows the presence of very undesirable transients in these magnetic components not having multiple magnetic discontinuities in their core structures and shows that the elimination of these undesired transients occurs when these discontinuities are introduced, and also shows that by having these discontinuities it is possible to obtain better signal response fidelity.

Elimination of distortion is also important in the logic elements as well as in heads, as this avoids the use of wave shaping components and gets rid of undesirable transients which confuse the logic system attempting to recognize the signals. Likewise the heads being distortion-free when multiple discontinuities are incorporated therein, make possible more pulse packing in a smaller area of recording surface when used in connection with computer applications, and in high fidelity recordings and result in higher quality performance as well as broader frequency spectrum recording on a smaller recording surface area. The improved fidelity and the elimination of negative transients which is the term given to that portion of the electrical response output signal that crosses the zero axis and has an electrical polarity opposite to the polarity of the signal desired, contributes to better fidelity of response and avoids confusion of the logic circuits attempting to recognize the polarity of the pulse, particularly when the logic system is a ternary type wherein the positive and negative pulses are each relegated to identify a different state of logic.

FIGW 12 is a schematic plan view of a magnetic logic ternary OR gate.

Figure 12:
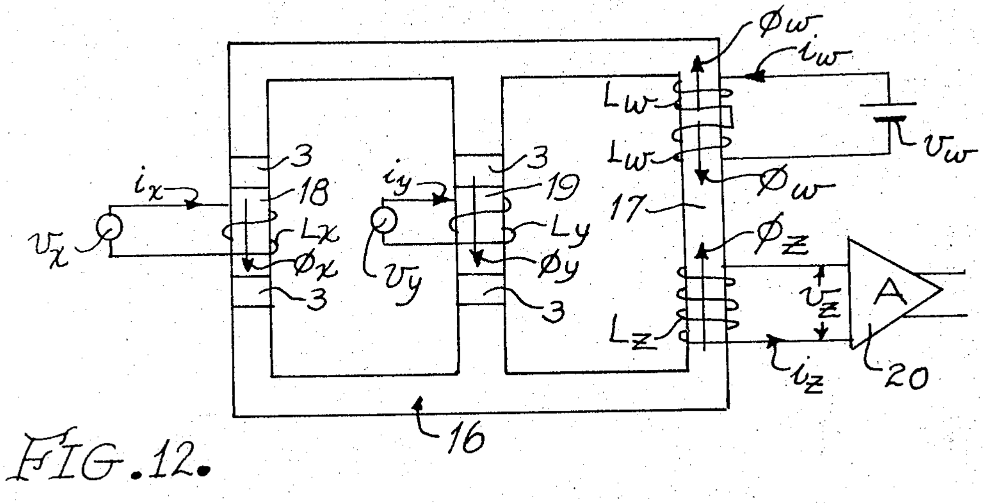
Figure 13:
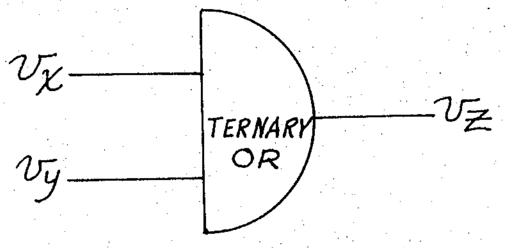

FIG. 13 is a symbolic schematic of FIG. 12 and including a set of tables showing the types and number of combination of logic outputs possible.

Figure 14:
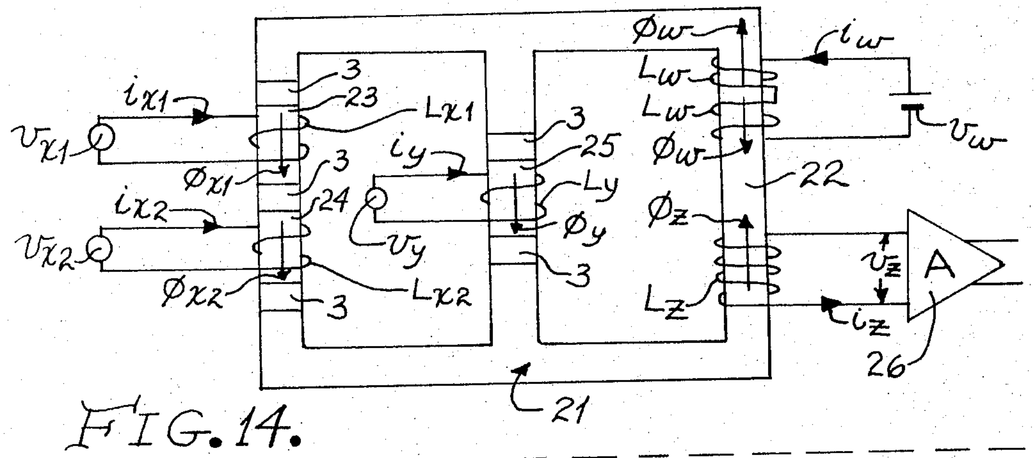

FIG. 14 is a schematic plan view of a magnetic logic ternary AND/OR gate.

Figure 15:
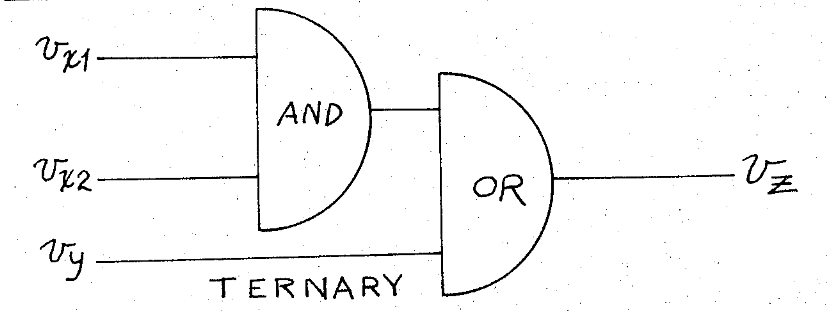

FIG. 15 is a symbolic schematic of FIG. 14 and including a set of tables showing the types and number of combinations of logic outputs possible.

Figure 16:
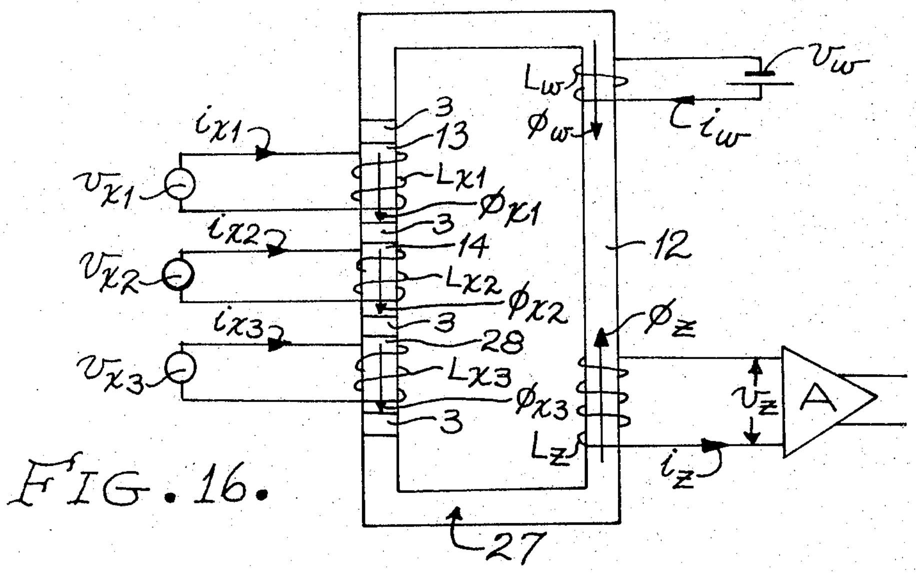

FIG. 16 is a schematic plan view of a magnetic logic binary VOTING gate.

Figure 17:
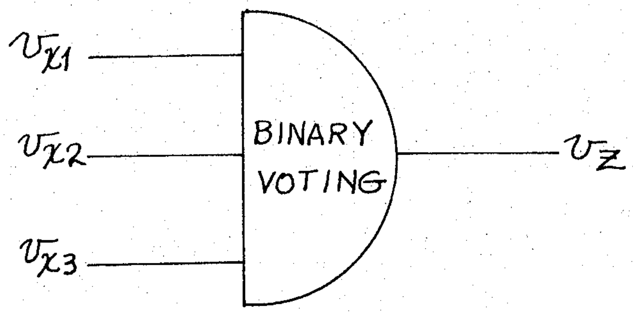

FIG. 17 is a symbolic schematic of FIG. 16 and including a set of tables showing the types and number of combinations of logic outputs possible.

Figure 18:
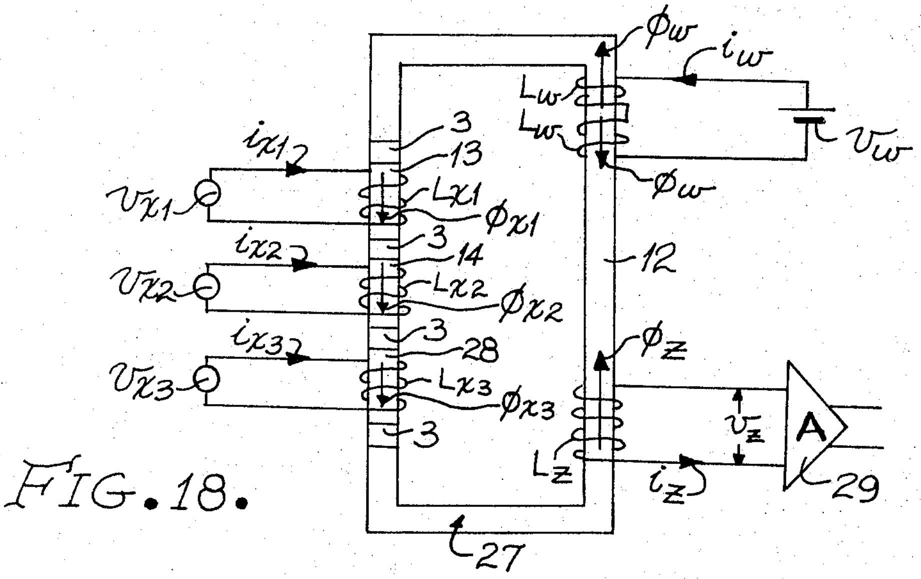

FIG. 18 is a schematic plan view of a magnetic logic ternary VOTING gate.

Figure 19:
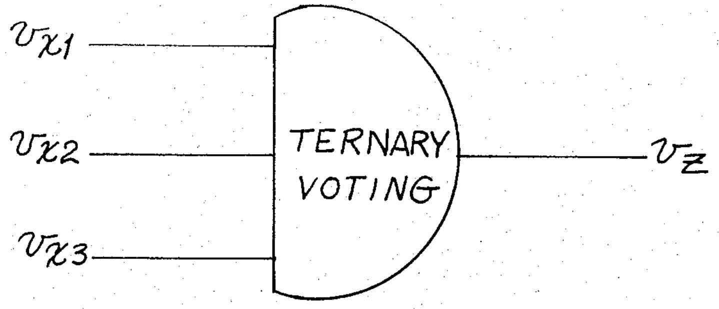

FIG. 19 is a symbolic schematic of FIG. 18 and including a set of tables showing the types and number of combinations of logic outputs possible.

Figure 20:
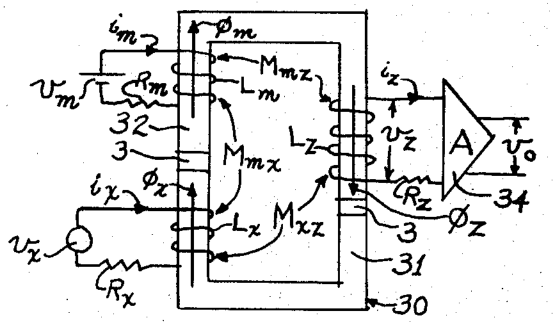

FIG. 20 is a schematic plan view of a magnetic logic NOT element wherein an amplifier at the output of this gate is normally biased by this NOT element so as to produce an output with no input pulse applied and to produce zero output with an input pulse applied.

Figure 21:
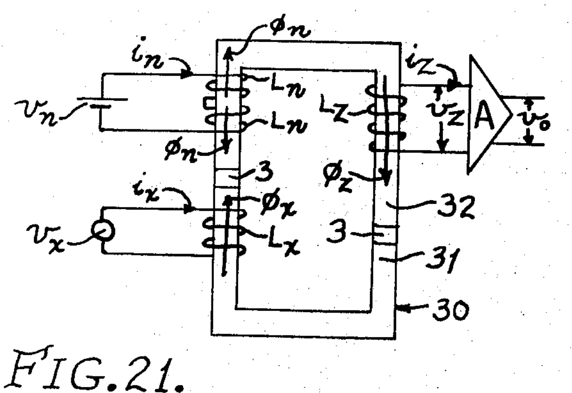

FIG. 21 is a schematic plan view of another magnetic logic NOT element wherein an amplifier at the output of this element is normally in the ON condition with a zero bias input, and when this element obtains either a positively or negatively polarized voltage at its input, the amplifier output is turned OFF, this element being responsive to ternary logic signals.

EXEMPLARY EMBODIMENT

Relationship Between Analyses Developed in Parent Application to this Specification The reader is now referred to aforementioned parent application Ser. No. 840,121, for the theoretical discussion of distortion components and transient behavior, wherein the distortion theory was discussed under topics therein entitled respectively "Amplitude Modulation in a Magnetic Structure with Analysis of Distortion Components," and "Transient Behavior of the Magnetic Element." In such theoretic discussions FIGS. 1, 2, 3 and 20 of this specification were utilized, but were numbered in the parent application respectively as FIGS. 1, 5, 6, and 4.

Both the distortion component analysis and the transient analysis are applicable to both magnetic heads and magnetic logic elements and for that matter to any magnetic element responsive to intelligence signals or producing intelligence signals.

Hysterysis Loop of the Magnetic Structure

Figure 1:
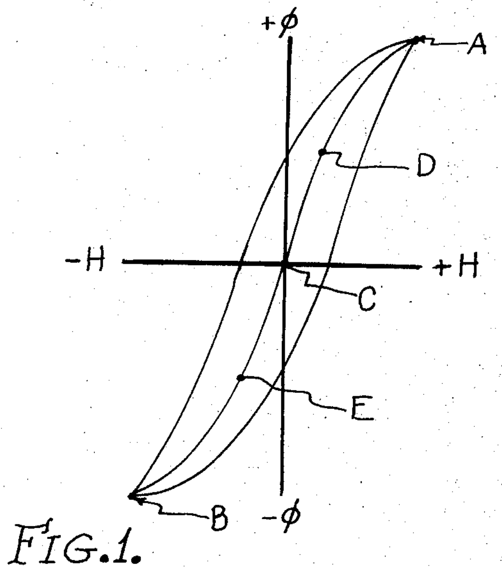
FIG. 1 is a graph of a typical magnetic core hysterysis loop applicable to all magnetic core structures of this invention.

Referring to FIG. 1 which is a typical magnetic hysterysis loop of a core material such as used in conjunction with the heads or logic gates, there is shown in this figure saturation levels A and B of the core material. Some of the binary gates will be shown to be biased at saturation level A when not being triggered, one binary type NOT gate will be shown in combination with an amplifier which normally has an output when the gate is operating at point D prior to a pulse input to the gate and subsequently shifts to either level A when the output desired is zero or to level E when the output desired is inverted or opposite to what is at the input of the gate. In the ternary case the normal biasing will be shown to be at point C or the magnetic origin prior to a pulse input to the gate and the operational point shifting either to point A or B when a pulse input is applied depending upon whether the pulse is positive or negative. In relation to the magnetic heads, the operating characteristics being alternating current responsive, the operation on the hysterysis loop may be described by the path ABA.

Figure 2:
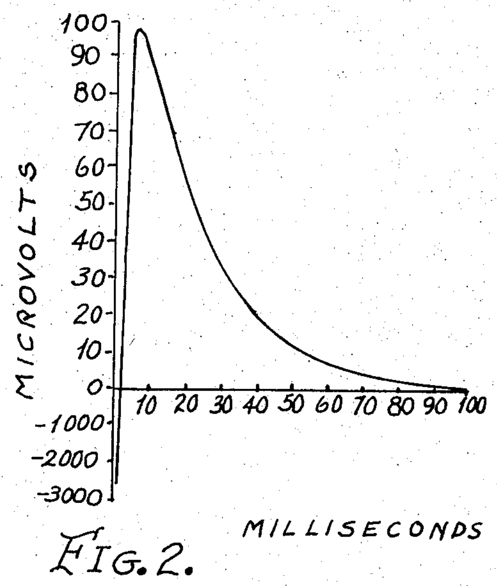
FIG. 2 is an output voltage response curve of the structure of FIG. 20 when the core structure thereof does not have core portions with multiple magnetic discontinuities.
Figure 3:
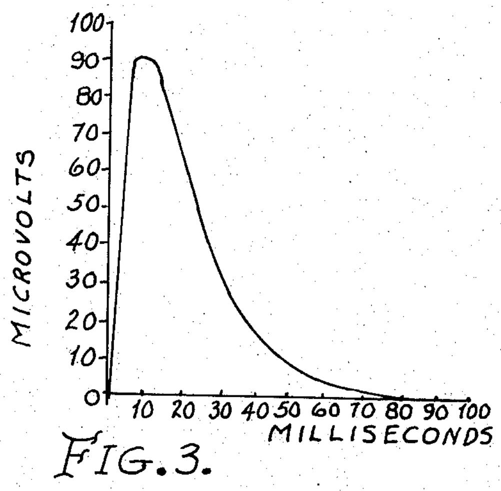
FIG. 3 is an output voltage response curve of structure of FIG. 20 except that the effect of introducing multiple discontinuities therein has been considered and showing the elimination of the large negative transient and wave shape improvement over the same core structure without these discontinuities.

Conclusions Derived From Analysis of Characteristic Curves and Theories Developed in Parent Application Analysis of the curves of FIGS. 2 and 3 shows that by the presence of multiple magnetic discontinuities in the core structure of FIG. 20 that the electrical response characteristics and the pulse fidelity are substantially improved. It is pointed out that the FIG. 3 condition represents a higher fidelity and better pulse than the FIG. 2 condition, since it is broader in width and of better shape. The maximum pulse output amplitudes are not substantially different in the desired pulse output polarity (positive pulse shown), but it is pointed out that the negative excursion of the pulse of FIG. 2 is very objectionable in that its transient in the negative direction is about 23.5 times the peak amplitude of the positive pulse. This is quite bad in that the logic gates must have additional discriminating means against this large negative pulse, and when the element is utilized as a ternary logic gate the positive and negative pulses at the same time would confuse the logic making it impossible to function. A pulse output having both positive and negative components would contribute to distortion and loss of wave shape fidelity.

It is now obvious based upon the transient responses without and with multiple magnetic discontinuities as shown respectively in FIGS. 2 and 3, the tremendous superiority in product performance is obtained by the introduction of multiple discontinuities in the magnetic core structures to be hereinbelow described. Care should also be exercised in choosing a balance of the parameters of inductance, resistance and mutual inductance so that the characteristic (denominator) of the current equation does not exhibit pairs of complex roots which is indicative of natural oscillation to be expected in the output when the magnetic element is energized by a pulse, step function or a sinusoidal variation impressed across one of its input coils.

It is also obvious from the discussions pertaining to modulation effects and to transient response, detailed in the parent patent application, that the magnetic record or reproduce head with multiple magnetic core discontinuities is capable of packing pulses or confining broad bands of information or intelligence frequency spectra on small magnetic surface areas as compared with a head not having these multiple discontinuities, the reason therefore being that more recording surface is made available for recording with essentially freedom from the distortion components that otherwise occupy a major portion of recording surface and hence the industry has been, up to the time of this discovery, compelled to run recording area with respect to the head or vice versa at high speed in order to provide the additional recording surface as a substitute for the recording surface wasted by the presence of distortion components. It is therefore concluded that in reality there is no such thing as a natural rate of change head, for all heads are normally flux responsive, except that without multiple core discontinuities these heads are compelled to record or reproduce the generated distortion components inherent in modulation and which are now eliminated by application of this discovery. Similar principles would apply to logic circuits insofar as providing distortionless output to recording surface areas for storage of information and for retrieving same at a later time. Of course, a head-logic element wherein the recording or reproducing head is combined with a logic element as described in this disclosure, below, for recording or reproducing distortion-free information to or from a recording surface, in which case there would be motion of this combination head-logic element with respect to the recording surface area or vice versa with the same beneficial results.

Analogy between Magnetic Heads and Logic Gate Structures

If the logic gates are of the magnetic types there is a remarkable analogy as well as structural and functional likeness of the gates to the heads, in that in all cases the magnetic core with a magnetic flux circulating therein combines with another flux making excursions from one biasing point to the $\phi$-H curve to another, and causing a voltage to be induced in the output coil. In both heads and gates it is desirable to minimize mutual flux components in the core structures thereof.

Distortionless Binary Magnetic Logic AND Gate

Figure 4:
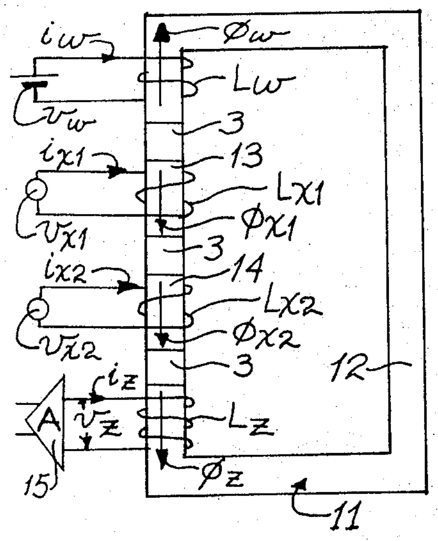
FIG. 4 is a schematic plan view of a magnetic logic binary AND gate.
Figure 5:
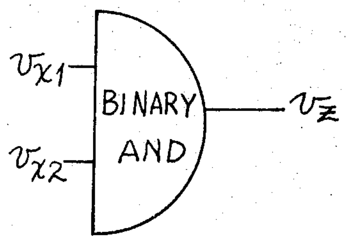
FIG. 5 is a symbolic schematic of the logic gate of FIG. 4 and including a set of tables showing the types and number of combinations of logic outputs possible.

Referring to FIGS. 1, 4 and 5, magnetic structure 11 is comprised of core portions 12, 13, and 14. Core portion 13 is separated from core portion 14 by means of non-magnetic separator 3, core portion 14 is separated from core portion 12 by means of another non-magnetic separator 3 and core portion 12 is separated from core portion 13 by means of a third non-magnetic separator 3. Core portion 12 has wound thereon coil $L_w$ in the direction shown, said coil being electrically connected to battery source having output voltage $v_w$ which provides current $i_w$ in coil $L_w$ for producing bias flux $\phi_w$ within core structure 11 in the direction indicated by the flux arrow. Core portion 12 also has wound thereon coil $L_z$ in the direction indicated, said coil being electrically connected to the input of amplifier 15 and being responsive to flux $\phi_z$ produced in said core 11 which produces voltage $v_z$ across the input of amplifier 15. Since the bias flux $\phi_x$ is a constant (non-alternating) flux, mutual flux components between the flux $\phi_w$ and $\phi_z$ will be zero, and hence no non-magnetic separator need be used to separate the portions of core bearing coils $L_w$ and $L_z$. Coil $L_{x1}$ is wound on core portion 13 in direction shown and electrically connected to voltage source having output $v_{xl}$ for producing current $i_{x1}$ in coil $L_{x1}$ and flux $\phi_{x1}$ is produced in core structure 11 in the direction shown. Coil $L_{x2}$ is wound in the direction shown on core portion 14 and electrically connected to voltage source having output $v_{x2}$ for producing current $i_{x2}$ in coil $L_{x2}$ which produces flux $\phi_{x2}$ in core structure 11 in the direction shown. The voltages from $v_{x1}$ and $v_{x2}$ being pulses of equal magnitude and of such polarity so as to swing the gate output from its bias position at point A of FIG. 1 due to the flux $\phi_x$ to point B due to fluxes $\phi_{x1}$ and $\phi_{x2}$ combined, overcoming bias flux $\phi_w$ thereby producing resultant flux $\phi_z$ in coil $L_z$ which produces output pulse $v_z$. It is noted that in general the order of magnitude of combined $\phi_{x1}$ and $\phi_2$ will be twice $\phi_w$ so as to overcome it and additionally to swing the flux in a direction to point B on the $\phi$-H curve of FIG. 1. After the duration of fluxes $\phi_{x1}$ and $\phi_{x2}$ the pulse output $v_z$ will disappear and the core structure 11 will restore itself to point A due to the influence of $\phi_w$; $v_{x1}$ and $v_{x2}$ can take on values of one and zero, thus there are four possible output combinations in terms of these inputs. These are clearly illustrated in FIG. 5 showing the quantity and types of outputs for the several inputs indicated. In the binary logic sense the significance of the one is that it indicates the presence of a signal pulse whereas a zero indicates its absence. The non-magnetic spacers which reduce mutual flux components so as to result in clean output pulses devoid of the distortion components, minimizes the peripheral wave shaping and restoration circuitry required normally therewith. The nomenclature $v_w$, $v_{xl}$, $v_{x2}$ although signifying voltage outputs also signify their sources. The tables of FIG. 5 show four AND combinations; three combinations for obtaining a zero output and only one combination for obtaining a one output. $v_{x1}$ and $v_{x2}$ being variables can mean a pulse might be present (a one condition), or a pulse might be absent (a zero condition).

Distortionless Binary Magnetic Logic OR Gate

Figure 6:
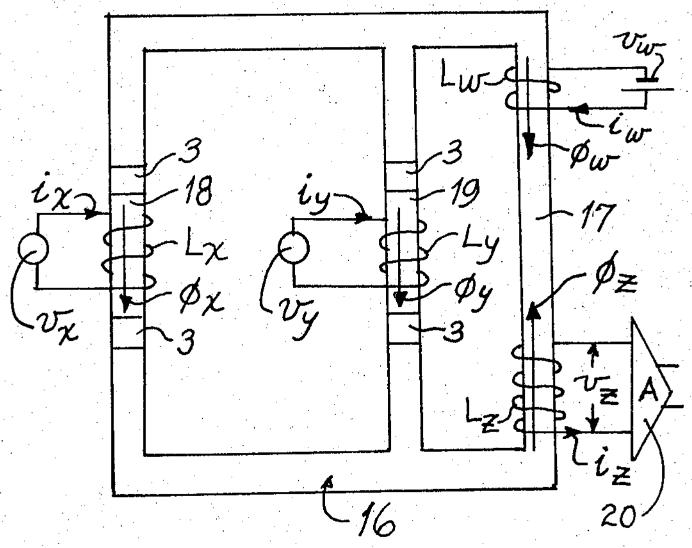
FIG. 6 is a schematic plan view of a magnetic logic binary OR gate.
Figure 7:
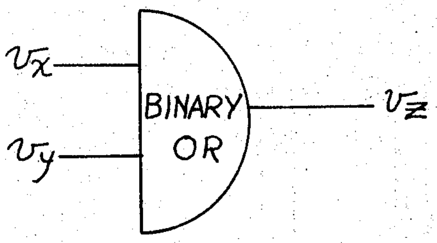
FIG. 7 is a symbolic schematic of the logic gate of FIG. 6 and including a set of tables showing the types and number of combinations of logic outputs possible.

Referring to FIGS 1, 6 and 7, magnetic structure 16 is comprised of core portions 17, 18 and 19. Core portion 17 is separated from core portions 18 and 19 by non-magnetic separators 3 and likewise core portions 18 and 19 are separated from each other by non-magnetic separators 3. Core portion 17 has bias winding $L_w$ wound thereon in the direction shown which is electrically connected to DC voltage source having voltage $v_w$ output for providing bias flux $\phi_w$ thereby biasing said core structure at point A of the hysterysis loop. Core portion 18 has winding $L_x$ thereon which is electrically connected to voltage source having voltage $v_x$ output for providing current $i_x$ through this coil and producing flux $\phi_w$ in the direction shown in core structure 16. Likewise, core portion 19 has coil $L_y$ wound thereon and electrically connected to the voltage source having voltage $v_y$ output for producing current $i_y$ in that coil for providing flux $\phi_y$ in the direction shown in core structure 16. Core portion 17 also has coil $L_z$ wound thereon and electrically connected to the input of amplifier 20 so that when either fluxes $\phi_x$ or $\phi_y$ alone or together being of large enough magnitude overcome flux $\phi_w$ thereby shifting bias from point A to point B in the hysteresis loop during the duration of either of the pulse periods of $v_x$ or $v_y$, then flux $\phi_2$ results which induces a voltage $v_z$ in coil $L_z$ thereby providing this pulse to amplifier 20 input. After the duration of either or both $v_x$ or $v_y$ the operating point is returned to point A by the bias flux $\phi_w$. The nomenclature of $w_w$, $v_x$, and $v_y$ apply to voltage outputs and may be thought of as the sources for those voltage outputs. Since $v_x$ and $v_y$ can take on values of zero or one, there are four possible output combinations in terms of these variables. FIG. 7 illustrates a symbolic schematic and tables showing the quantity and types of output for the several inputs indicated in tables therefor. The binary logic significance of the one in the OR gate also indicates the presence of a signal and the zero the absence thereof. The non-magnetic spacers herein which reduce mutual flux components in the core structure so as to result in clean output pulses devoid of distortion components and hence minimizes the peripheral wave shaping and restoration circuitry normally required. The tables of FIG. 7 show four OR combinations; one combination for obtaining a zero output and three combination for obtaining a one output. Input pulses $v_x$ and $v_y$ may each take on two states, the state of presence (the one condition) or the the state of absence (the zero condition).

Distortionless Binary Magnetic Logic AND/OR Gate

Figure 8:
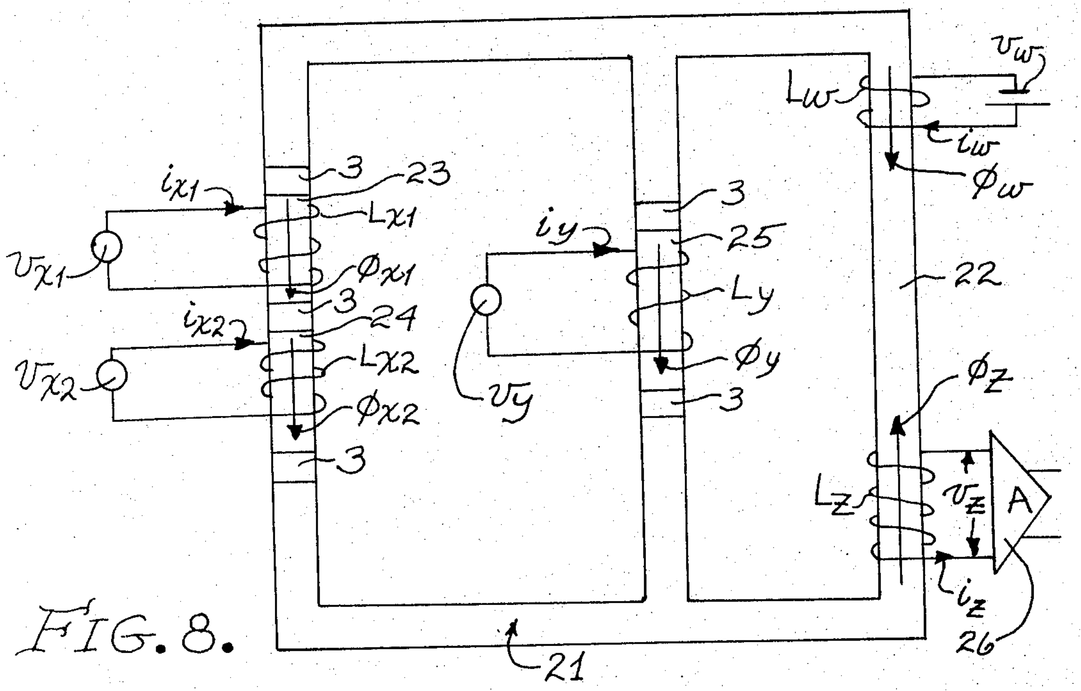
FIG. 8 is a schematic plan view of a magnetic logic binary AND/OR gate.
Figure 9:
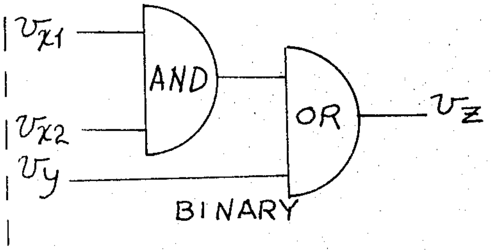
FIG. 9 is a symbolic schematic of the logic gate of FIG. 8 and including a set of tables showing the types and number of combinations of logic outputs possible.

Referring to FIGS. 1, 8 and 9, magnetic core structure 21 is comprised of core portions 22, 23, 24, 25. Core portion 22 is separated from core portions 23, 24 and 25 by non-magnetic separators 3 and core portion 23 is separated from core portion 24 by a similar non-magnetic separator. Core portion 22 has wound thereon coil $L_w$ in the direction shown, said coil being electrically connected to source of DC having voltage output $v_w$ which provides a current $i_w$ in coil $L_w$ for producing bias flux $\phi_w$ within core structure 21 in the direction indicated by the arrow. Core portion 22 also has mounted thereon output coil $L_z$ which is electrically connected to amplifier 26 for producing an output $v_z$ thereto. Core portion 23 has wound thereon coil $L_{x1}$ in the direction shown which is electrically connected to a voltage source having $v_{x1}$ pulse output for producing a current $i_{x1}$ in coil $L_{x1}$ thereby producing flux $\phi_{x1}$ in the direction shown. Likewise core portion 24 has wound thereon coil $L_{x2}$ in the direction shown which electrically connects to a pulse source having an output voltage pulse $v_{x2}$ for producing current $i_{x2}$ in coil $L_{x2}$ thereby producing flux $\phi_{x2}$ in the direction shown in core structure 21. Core portion 25 has wound thereon coil $L_y$ in the direction shown and is electrically connected to pulse source producing output pulse $v_y$ for providing current $i_y$ in coil $L_y$ thereby producing flux $\phi_y$ in the direction shown in core structure 21. Hence, when fluxes $\phi_{x1}$ and $\phi_{x2}$ combine algebraically with flux $\phi_y$ in any of the combinations shown in the tables of FIG. 9, flux $\phi_w$ is overcome producing flux $\phi_z$ so as to induce a voltage in coil $L_z$ output of the various combinations of output as shown in the tables of FIG. 9, and producing zero output under three different conditions as shown in these tables. Hence, the possible combinations include pulses from sources $v_{x1}$ together with $v_{x2}$ or a pulse of $v_y$ alone. It stands to reason that the presence of both $v_{xl}$ and $v_{x2}$ are required to produce a one output from the AND portion of this gate and $v_y$ output of value one alone is required to produce an output from the other branch of the gate when both $v_{x1}$ and $v_{x2}$ are both zero or when either of them is zero. Hence $\phi_{x1}$ and $\phi_{x2}$ would each have to be equal in magnitude and their sum be equal in magnitude to $\phi_y$ and each set would be larger than $\phi_w$ so as to overcome $\phi_w$ and drive the operating point from point A on the hysterysis loop to point B during the duration of the input pulses in order to obtain the $v_z = 1$ output. When $v_z = 0$, logic gate is in a quiescent state at point A of the hysterysis loop.

Distortionless Ternary Magnetic Logic AND Gate

Figure 10:
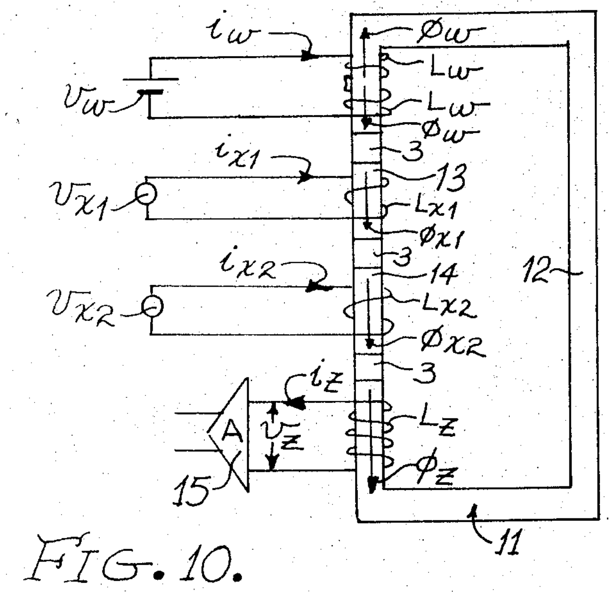
FIG. 10 is a schematic plan view of a magnetic logic ternary AND gate.
Figure 11:
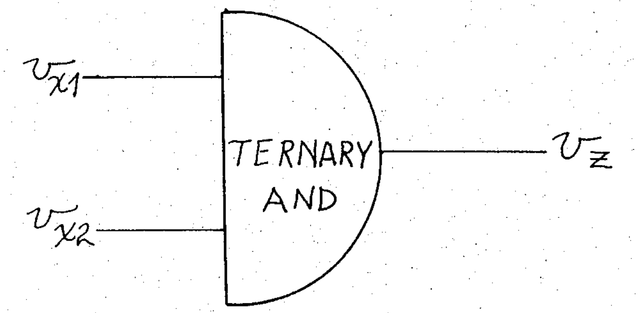
FIG. 11 is a symbolic schematic of the logic gate of FIG. 10 and including a set of tables showing the types and number of combinations of logic outputs possible.

Referring to FIGS. 1, 10 and 11, magnetic structure 11 is comprised of core portions 12, 13 and 14, having non-magnetic spacers 3 separating these portions 12, 13 and 14, having non-magnetic spacers 3 separating these portions from each other. This structure is identical to the binary AND gate, the essential difference being that instead of having one coil $L_w$ there are two coils $L_w$ of identical inductance (identical number of turns), but the inductances are wound in opposite directions on core portion 12. These inductances are electrically connected in series and are powered by a single DC power source $v_w$ which provides the necessary voltage to produce current $i_w$ in these to coils. Since the current is the same and the coils are the same but for opposite directions of winding flux pair $\phi_w$ in opposite directions to each other will be produced in core structure 11 of FIG. 10. Similarly as in the binary case, coil $L_{x1}$ is wound upon core portion 13 and has voltage output $v_{xl}$ from a pulse source, this pulse source being connected to coil $L_{xl}$ so as to provide current $i_{xl}$ through coil $L_{xl}$. This produces flux $\phi_{xl}$ in core structure 11. Also coil $L_{x2}$ is wound on core portion 14 and has voltage source providing pulse output $v_{x2}$ this voltage source being electrically connected to coil $L_{x2}$ for providing flux $\phi_{x2}$ as shown by arrows. The combination of $\phi_{xl}$ and $\phi_{x2}$ when in the same direction will overcome one of the fluxes $\phi_w$ so as to provide a flux $\phi_z$ in coil $L_z$ thereby inducing voltage $v_z$ at input to amplifier 15. Polarization of ZERO, PLUS or MINUS of the input pulses $v_{xl}$ and $v_{x2}$ are possible. ZERO polarization of course means that there is no input pulse, however, inasmuch as polarization of the input pulses will determine the direction of the fluxes $\phi_{x1}$ and $\phi_{x2}$ to obtain either ZERO output, PLUS output or MINUS output by either $\phi_z$ being zero, or being in one direction which we shall define as the positive direction giving a PLUS output or being in a direction opposite to said one direction giving MINUS output. The logic is symbolically illustrated in FIG. 11 and the number and types of outputs obtainable giving different input pulses are given in the tables of FIG. 11. In this type of gate, we will have seven different combinations of $v_{x1}$ and $v_{x2}$ to obtain $v_z=0$ output, and we will have only one combination each to obtain $v_z=+1$ and $v_z=-1$ respectively, for a total of nine different combinations. Other considerations such as involving clean pulses and freedom from distortion are as stated in the AND binary gate, detailed above. The ternary gate has another application as a NOT gate, so that when only one signal input pulse of large enough magnitude is used to overcome one of the bias fluxes, depending on the polarization of the input signal, the output will provide the polarity reverse of the input if the output coil $L_z$ is wound in a direction opposite to the direction shown in FIG. 10.

Distortionless Ternary Magnetic Logic OR Gate

Referring to FIGS. 1, 12 and 13, magnetic structure 16 is comprised of core portions 17, 18 and 19, having non-magnetic spacers 3 separating each of these portions from each other. This structure is identical to the binary OR gate the essential difference being that instead of having one coil $L_w$ there are two such coils of identical number of turns and identical resistance and wound in opposite directions on core portion 17. These coils are electrically connected in series and are powered by a single DC power source having a voltage output $v_w$ which provides the current $i_w$ in these coils so as to produce two fluxes of equal magnitude but opposite in direction from each other, each called $\phi_w$ and as shown by the arrows of direction in FIG. 12, thereby holding the operating point at the magnetic origin C of the $\phi$-H hysterysis loop. Similar to the binary case, coil $L_x$ is wound upon core portion 18 and has pulse source electrically connected thereto producing pulse voltage $v_x$ for providing a pulse so as to create current $i_x$ in coil $L_x$ and flux $\phi_x$ in core structure 16. Likewise, coil $L_y$ is wound upon core portion 19 and has voltage producing pulse source that provides a pulse output $v_y$ electrically connected to coil $L_y$ for providing a pulse so as to create current $i_y$ in coil $L_y$ and flux $\phi_y$ in core structure 16. Core portion 17 also has coil $L_z$ wound thereon so that when either fluxes $\phi_x$ or $\phi_y$ alone or together being of large enough magnitude can overcome flux $\phi_x$ thereby shifting from bias point C to either bias points A or B of the hysterysis loop dependent upon whether the pulse inputs are positive or negative, thereby producing flux $\phi_z$ and inducing voltage $v_z$ in coil $L_z$ for passing on this voltage to amplifier input of amplifier 20 which coil $L_z$ is connected to, and this voltage is applied to the amplifier during the period of duration of these input pulses $v_x$ or $v_y$. These input pulses are described in terms of the voltage sources providing same in the symbolic schematic of FIG. 13 as well as in the tables therein showing the different number and types of combinations of outputs of $v_z$ possible and showing the various combinations of ZERO, PLUS ONE and MINUS ONE states of $v_x$ and $v_y$ to obtain such combinations. It is pointed out that this gate will respond to both $v_x$ and $v_y$ output of either plus one or minus one, shifting the bias from either C to A or from C to B. The basis for this is that either $v_x$ or $v_y$ alone are of large enough amplitude to shift to either point A or B. Since these points are saturation levels of core structure 16, the presence of both fluxes $\phi_x$ and $\phi_y$ will not enable a shift along the hysterysis curve beyond the limits of either points A or B, the directions of these fluxes being assumed to be in the same direction. The non-magnetic spacers 3 or equivalent means of obtaining core discontinuities such as skewing of the core portions with respect to each other so the ends of these portions do not align with each other, will operate to reduce the undesired mutual flux components and hence distortion, and will render a wave shape which is clean of distortion components and transients of the negative character, thereby not requiring additional peripheral wave reshaping means in a system that utilizes these gates.

Distortionless Ternary Magnetic Logic AND/OR Gate

Referring to FIGS. 1, 14 and 15, magnetic structure 21 is comprised of core portions 22, 23, 24 and 25. Each core portion is separated from the others by means of non-magnetic separators 3 which provide magnetic discontinuities in the core structure portions and are used for structurally integrating core structure 21. These core portions may be skewed or partially skewed with respect to each other thereby misaligning the core portions and providing magnetic disconticontinuities for reduction of mutual flux components and transients thereby providing distortionless output. Core portion 22 has wound thereon a pair of coils $L_w$ connected in series, each of these coils are identical in the number of turns and in inductance and resistance but are wound in opposite directions from each other so that when DC power means provides voltage $v_w$ to these pair of coils, current $i_w$ is produced thereby producing a pair of equal and opposite fluxes $\phi_w$ in core structure 21 and holding this core structure biased at the magnetic origin C of the hysterysis loop. Core portion 22 also has wound thereon output coil $L_z$ which is electrically connected to amplifier 26 which accepts at its input a voltage $v_z$. Core portion 23 has wound thereon coil $L_{x1}$ in the direction shown which is electrically connected to pulse source providing pulse output $v_{x1}$ for producing current $i_{x1}$ in coil $L_{x1}$ thereby producing flux $\phi_{x1}$ in the direction shown. Likewise, core portion 24 has wound thereon coil $L_{x2}$ in the direction shown, which is electrically connected to pulse source that provides an output pulse $v_{x2}$ for producing current $i_{x2}$ in coil $L_{x2}$ thereby producing flux $\phi_{x2}$ in the direction shown in core structure 21. Core portion 25 has wound thereon coil $L_y$ in the direction shown and is electrically connected to pulse source having an output pulse $v_y$ for producing current $i_y$ in coil $L_y$ thereby providing flux $\phi_y$ in the direction shown in core structure 21. Hence, when fluxes $\phi_{x1}$ and $\phi_{x2}$ combine algebraically with flux $\phi_y$ in any of the combinations shown in the tables of FIG. 15, one of the fluxes $\phi_w$ is overcome thereby producing flux $\phi_z$ in core structure 21 so as to induce a voltage $v_z$ in coil $L_z$ and providing current $i_z$ and voltage $v_z$ as inputs to amplifier 26. There are nine combinations of $v_{x1}$, $v_{x2}$ and $v_y$ under which output $v_z$ is zero. There are nine combinations of $v_{x1}$, $v_{x2}$ and $v_y$ under which output $v_z=+1$, and there are nine combinations of $v_{x1}$, $v_{x2}$ and $v_y$ under which output $v_z=-1$. The nine combinations in each of the three states of logic provide totally 27 combinations. It is therefore possible to have pulses $v_{x1}$ and $v_{x2}$ together or to have pulse $v_y$ alone, and hence in one case $\phi_{x1}$ and $\phi_{x2}$ together overcoming one of the bias fluxes $\phi_w$ and shifting the operating point on the hysterysis loop from C to either points A or B depending on pulse polarities, or in another case where $\phi_y$ alone overcomes one of these bias fluxes depending on which polarity pulse $v_y$ has. It stands to reason that the presence of both $v_{x1}$ and $v_{x2}$ are required to produce either a PLUS ONE or a MINUS ONE output from the one leg of this gate and a $v_y$ output of either a PLUS ONE or a MINUS ONE output from the other leg of this gate to obtain an output $v_z$. Hence $\phi_{x1}$ and $\phi_{x2}$ would each have to be equal in magnitude and their sum equal in magnitude to $\phi_y$ so as to overcome one of the $\phi_w$'s and drive the operating point from point C on the hysterysis loop to point A or to point B depending on the polarity of the input pulses during the periods of duration of these input pulses so as to obtain $v_z=+1$, $v_z=-1$. When $v_z=0$, the logic gate is in a quiescent state at point C of the hysterysis loop. It is noted that various combinations of +1 and −1 for $v_{x1}$, $v_{x2}$, $v_y$ will also give zero output, the logic gate being in a quiescent state under these combinations found in the tables of FIG. 15.

Distortionless Binary Magnetic Logic VOTING Gate

Referring to FIGS. 1, 16 and 17, magnetic core structure 27 is comprised of core portions 12, 13, 14, and 28. These core portions are separated from each other by means of non-magnetic separators 3. Core portion 12 has bias coil $L_w$ wound thereon which is electrically connected to a DC power means producing a voltage $v_w$ which causes a current $i_w$ to flow in coil $L_w$ thereby producing flux $\phi_w$ in core structure 27 for saturating said core structure 27 at point A of the hysteresis loop. Core portion 13 has coil $L_{x1}$ wound thereon and electrically connected to a pulse source which provides pulse voltage $v_{x1}$ thereby producing current $i_{x1}$ which provides flux $\phi_{x1}$ in core structure 27. Core portion 14 has coil $L_{x2}$ wound thereon and electrically connected to a pulse source which provides pulse voltage $v_{x2}$ thereby producing current $i_{x2}$ in coil $L_{x2}$ which produces flux $\phi_{x2}$ in core structure 27. Core portion 28 has coil $L_{x3}$ wound thereon and electrically connected to a pulse source which provides a pulse voltage $v_{x3}$ producing current $i_{x3}$ in coil $L_{x3}$ for providing flux $\phi_{x3}$ in core structure 27. Core portion 12 also has coil $L_z$ wound thereon and electrically connected to amplifier 29 for providing current $i_z$ in amplifier input circuit as well as voltage $v_z$ which is a binary voting combination of any two out of the three pulses $v_{x1}$, $v_{x2}$, $v_{x3}$. The combinations producing the outputs take account of the states of logic for each of these voltages which are variables since they take on either state one or state zero. The table of FIG. 17 shows four possible combinations of these variables under which zero output is achieved and also shows another four possible combinations of these variables under which a one output is achieved. The principle involved is that each of the fluxes $\phi_{x1}$, $\phi_{x2}$, $\phi_{x3}$ are equal in magnitude to $\phi_w$, so that since these fluxes are algebraically additive, two fluxes will overcome and swing the logic gate from point A to point B on the hysteresis loop. Of course the presence of three such fluxes will also do likewise. By the same method logic gates could be established where any number of input pulses out of any quantity available can be made to swing the gate from point A to point B.

Distortionless Ternary Magnetic Logic VOTING Gate

Referring to FIGS. 1, 18 and 19, the ternary magnetic logic gate shown therein is identical to the binary volting logic gate of FIG. 16, except for the fact that the bias coil $L_w$ now is a pair of coils $L_w$ identical in inductance and number of turns and in resistance but wound opposite to each other in direction and electrically connected in series to a DC bias source which provides an output voltage $v_w$ for providing current $i_w$ in the pair of coils $L_w$ thereby providing two fluxes $\phi_w$ of equal magnitudes but opposite in direction to each other so as to maintain core structure 27 at the magnetic origin C of the hysteresis loop. This gate but for the two bias fluxes is therefore identical to the structure of the binary VOTING gate, however it is quite different in function. Firstly instead of a total of eight possible output combinations there are 27; 19 combinations yielding $v_z = 0$, four combinations yielding $v_z = +1$, and four combinations yielding $v_z = -1$. The larger quantity of combinations is possible in view of the capability of the fluxes resulting from the input pulses being either of two polarities or being zero polarity. The principle is essentially as in the binary case except for the polarity of the pulses. It is of course realized that two pulses of opposite polarity will produce zero, and of course two pulses of the same polarity and one pulse opposite polarity will also produce zero since one pulse will effect cancellation on one of opposite polarity, and since this logic gate has been basically set up to require two effective signal fluxes to pull from operating point C to either A or B depending on the pulse polarities, then the remaining effective pulse will not be adequate by itself to change the operating level from point C to either points A or B on the hysteresis loop, ince one of each of the signal fluxes is needed to overcome one of the bias fluxes $\phi_w$, the other of fluxes $\phi_w$ adding to the other signal flux to move the operating point from C to either A or B of the hysteresis loop depending on polarities involved. Of course this logic could have been designed where only one pulse coming along would overcome one of the fluxes $\phi_w$ thereby changing the operating point from the magnetic origin C to either points A or B. But this is not desired here, where by definition there must be at least two pulses of the same polarity without having a third pulse of a different polarity (zero polarity is not considered different polarity here) to in effect cancel one of the $\phi_w$ fluxes during the duration time thereof.

Distortionless Magnetic Binary Logic NOT Element

Referring to FIGS. 1 and 20, magnetic core structure 30 is comprised of core portions 31 and 32. Core portion 32 has wound thereon bias coil $L_m$ which is electrically connected to a DC source having a voltage output $v_m$ which provides current $i_m$ in the coil for producing flux $\phi_m$ in core structure 30. Core portion 31 has wound thereon coil $L_x$ which is electrically connected to a pulse source having an output pulse $v_x$ which provides current $i_x$ in this coil for producing flux $\phi_x$. Core portion 32 also has wound thereon coil $L_z$ which is electrically connected to amplifier 34 which is responsive to voltage $v_z$, the output of coil $L_z$ due to current $i_z$ flowing therein and produced by flux $\phi_z$ in magnetic core structure 30 which in turn is produced by virtue of flux $\phi_m$ when voltage $v_x = 0$ at input to coil $L_x$, holding the operating point of the gate at point D of the hysteresis loop, and in view of the fact that this bias allows apparatus 34 to normally produce an output signal $v_o$. However, during the duration of input pulse $v_x$, flux $\phi_x$ thereby produced will add to the flux $\phi_m$ thereby shifting operating point D on the hysteresis loop to point A and cutting off output $v_o$ from amplifier 34 for a similar duration of time. When the duration of pulse $v_x$ is complete, $i_x$ goes to zero and hence $\phi_x$ goes to zero and the operating point on the hysteresis loop is restored to point D thereby allowing amplifier 34 to produce output $v_o$ . The change in bias point or the hysteresis loop so as to convert a finite output of a zero output changes the state to a state opposite to its normal state, and in a binary logic sense this type of an element is called a NOT gate, and is used where inhibit action is desired. This logic element can also provide a negative output pulse by reversing the direction of the winding $L_x$ thereby changing the direction of flux $\phi_x$ which opposes $\phi_m$ and shifts from point D to point E thereby reversing the polarity of the output $v_o$. This is considered a NOT type action since it provides some other output than the normal output when no input pulse to this element is available.

In general the binary logic element of the NOT type may be used in combination with a binary AND or a binary OR gate to convert to either a binary NAND or NOR type binary gates respectively, or to convert the binary AND/OR or VOTING gates to binary NAND/-NOR or NOT VOTING gates, obtaining opposite effects from these gates.

Distortionless Magnetic Ternary Logic NOT Element

Referring to FIGS. 1 and 21, the ternary logic element is identical in structure to the binary logic NOT element except for having two identical windings $L_n$ wound in opposite directions on core member 32 and electrically connected in series to a DC voltage source providing voltage $v_n$ which produces current $i_n$ in both coils $L_n$ so that fluxes $\phi_n$ of equal magnitude but in opposite direction are produced in core structure 30. This holds the core in bias at the magnetic origin C of the hysterysis loop. The basic difference in the ternary NOT and the binary NOT is that in the binary NOT only one change of state is possible, but in the ternary NOT two changes of state are possible, a change from the zero to the plus one state or from the zero to the minus one state. In terms of the hysterysis loop this means a change from point C to point A, or from point C to point B. Since amplifier 33 is connected to coil $L_z$, similar to the electrical connection of amplifier 34 to its output coil in the binary NOT configuration, but in the ternary NOT, amplifier 33 is permitted to conduct so that an output signal $v_o$ is provided when input signal from input pulse source $v_x$ is zero. When $v_x$ is either a positive pulse or a negative pulse then one or the other of the two fluxes $\phi_n$ will be overcome so as to shift the operating point on the hysterysis loop from C to A, or from C to B, in either case cutting off amplifier output $v_o$ during the period of either the negative or positive states of pulse $v_x$ and providing an inhibit to amplifier 33. The logic ternary NOT is necessary in a ternary system because two different states (other than zero state) are available when it is desired to inhibit the output or reverse same.

In general the ternary logic NOT element may be used in combination with a ternary AND or a ternary OR gate to convert to either a NAND or a NOR type ternary gate, and similarly convert the AND/OR or the VOTING ternary logic gates to a NAND/NOR or a NOT VOTING ternary type of gates obtaining opposite effects from these gates.

General Considerations

Specifically, in the ternary logic, the zero, positive and negative conditions may be considered respectively as the 0, 1 and 2 states. In comparing the number of bits or pulses required to comprise a word or an equivalent number of the decimal system, we find that there are approximately 50 percent less bits for the ternary word as compared to the binary word. The number of circuits required to build a computer type of apparatus using the ternary system is also comparably decreased.

In the ternary system it is necessary to use both positive and negative bias fluxes (fluxes in opposite direction from each other) simultaneously since using both these fluxes guarantees the zero $\phi$-H operating point on the hysterysis loop, whereas the absence of both these bias fluxes is not possible inasmuch as after either the first negative or positive pulse is applied and removed, a residual flux will remain in the core which will prevent the follow-on pulses from returning to and through the $\phi$-H origin. It should also be noted that the same criteria for the voltage level of the signal pulses apply both to the binary and ternary conditions.

Distortion of the output signal consisting essentially of phase and frequency distortion and undesireable transients are basically caused by the presence of mutual magnetic flux components in a magnetizeable core structure caused by interaction of a carrier flux with a flux bearing intelligence. Minimization of these mutual flux components is therefore very desireable. This is accomplished in all of the configurations described hereinabove by providing discontinuities in the magnetic core structure. Discontinuities may be provided by injecting non-magnetic separators in between the several core portions that comprise the core structure, or by skewing or misalignment of these core portions so that the ends thereof do not abut each other exactly but rather part of the sides thereof are layed over each other in such a way so as to have the ends clearly visible, or the ends of the core portions partly abut each other, or the ends partly abut each other with non-magnetic separators at the juncture of these ends, or any combination of non-magnetic separators, skewing, core misalignment so as to result in reduction in said mutual flux components due to introduction of the various discontinuities in the magnetic core structure which in effect minimizes phase and frequency distortion, increases the fiedlity of pulse and wave shape, eliminates objectionable transients of electrical polarity opposite to the electrical polarity of the desired output signal, increases the band width characteristics of the several magnetic components described hereinabove, and provides a better magnetic record or reproduce head and better magnetic logic components of the binary or ternary types.

Hence, in view of the foregoing, a magnetic binary logic element, a magnetic ternary logic element and a magnetic logic NOT element as well as other combination of logic elements such as AND, OR, AND/OR and VOTING magnetic logic devices have the common characteristics stated broadly as, a magnetic means for providing virtually distortionless output, comprising a magnetizable core structure comprising a plural number of core portions having coil means thereon and having a first main core flux and a second main core flux interacting within the core structure thereby producing mutual flux components due to this interaction, and the magnetizable core structure has mutliple magnetic discontinuities where at least one of the discontinuities is provided at a junction of any two of the core portions, the discontinuities producing attenuation of the mutual flux components thereby providing virtually distortionless output of the magnetic means.

Further, and referring particularly to FIGS. 4, 6, 8 and 16, and in addition to the common characteristics as stated above, the binary magnetic logic element has a first coil means which is part of the coil means retained on a first of the plural number of core portions responsive to electrical input signal for producing the first main core flux which acts as a magnetic bias at one of two magnetic saturation levels of the flux-field hysterysis loop of the magnetizeable core structure. A second coil means for the coil means is at least one of a plural number of coils retained on a second of the plural number of core portions and responsive to electrical pulses for providing the second main core flux for overcoming the magnetic bias and for shifting from one to the other of the two magnetic saturation levels. A third coil means of the coil means is retained on the magnetizable core structure and responsive to the saturation level shift for selectively providing binary logic output.

Further, and referring particularly to FIGS. 10, 12, 14 and 18, and in addition to the common characteristics stated above, the ternary magnetic logic element has first and second coils of the coil means which are retained on a first of the plural number of core portions responsive to electrical input signals for producing a pair of first magnetic flux components of equal amplitude and opposite direction in the magnetizable core structure comprising the first main core flux for biasing the logic element at the magnetic origin of the flux-field hysterysis loop of the magnetizable core structure. A second coil means of the coil means has at least one of a plural number of coils retained on a second of the plural number of core portions responsive to positive and negative electrical pulses for providing the second main core flux and for overcoming at least one of the first magnetic flux components and for shifting the bias point away from the magnetic origin. A third coil means of the coil means is retained on the magnetizable core structure and responsive to the bias shift for selectively providing ternary logic output therefrom.

Further, and referring particularly to FIGS. 20 and 21, and in addition to the common characteristics as stated above, the magnetic logic NOT element has a first coil means of the coil means which is retained on a first of the plural number of core portions responsive to electrical input signal for producing the first main core flux for magnetically biasing the logic element at a predetermined point of the flux-field hysterysis loop of the magnetizable core structure. A second coil means of the coil means is at least one of a plural number of coils retained on a second of the plural number of core portions responsive to electrical pulses for producing the second main core flux in the magnetizable core structure thereby shifting the magnetic bias point from its location within the confines of the flux-field hysterysis loop to another location therein. A third coil means of the coil means is retained by the magnetizable core structure and is responsive to the bias shift and to a change of state of the logic and thereby provides an inverted or logic NOT output.

I claim:

1. A magnetic binary logic element, comprising in combination:

a magnetizable core structure;

means integral with the core structure for providing a magnetic bias point on the flux-field hysterysis loop of the core structure, said core structure having two saturation levels on its flux-field hysterysis loop;

input means secured to the core structure for providing signal intelligence input to the logic element for producing a signal flux in the core structure and for shifting the magnetic bias point on the flux-field hysterysis loop, said input means and means integral with the core structure having a finite coefficient of coupling therebetween of a magnitude of less than 0.9; and output means secured to said core structure for providing logic outputs from said logic element in accordance to the signal intelligence, wherein the bias point is at a first of the two saturation level locations and the signal flux produces a shift of the bias point to the second of the two saturation level locations thereby providing a binary output signal at said output means.

2. The invention as stated in claim 1:

the bias point being located on the flux-field hysterysis loop away from either of the two saturation level locations; and the signal flux producing a shift of the bias point to either of the two saturation levels for providing a logic signal externally of said logic element.

3. The invention as stated in claim 2:

the bias point being located intermediate between the origin and one of the two saturation levels of the flux-field hysterysis loop.

4. The invention as stated in claim 2;

the bias point being located substantially at the magnetic origin of the flux field hysterysis loop.

5. The invention as stated in claim 1 being a voting logic element:

the input means being a plurality of coils, each of said plurality of coils being responsive respectively to individual intelligence signals which produce flux components in the core structure the sum of at least any two of the flux components providing a logic output at the output means, and the absence of said at least any two of the flux components results in absence of logic output at the output means.

6. The invention as stated in claim 1 being a voting logic element:

the input means being a plurality of coils, each of said plurality of coils being responsive respectively to individual intelligence signals which intelligence signals are polarized in any of two senses thereby producing corresponding signal flux components in any of two directions wherein at least two of the signal flux components having the same direction in the core structure provide a logic output at the output means; and the absence of said at least two of the signal flux components of the same direction, or the presence of said at least two of the signal flux components wherein the algebraic sum of directions thereof results in less than two directions in magnitude irrespective of sense of said magnitude, results in no logic output at the output means.

7. The invention as stated in claim 1 being a binary AND logic element:

the input means being at least two coils, each of said at least two coils being responsive respectively to individual intelligence signals which produce flux components in the core structure the sum of which provide a logic output at the output means and the presence of only one of said intelligence signals producing no output at the output means.

8. The invention as stated in claim 1 being a binary OR logic element:

the input means being at least two coils, each of said at least two coils being responsive respectively to individual intelligence signals which produce flux components in the core structure, each of the flux components individually being sufficient to provide a logic output at the output means.

9. The invention as stated in claim 1 being a binary AND/OR logic element:

the input means being at least two coils, each of said at least two coils being responsive respectively to individual intelligence signals which produce flux components in the core structure the sum of which produce a first flux in the core structure and the presence of only one of said intelligence signals prevent production of said first flux; and the input means comprising at least another coil responsive to other signal intelligence input for producing a second flux in the core structure, the sum of the first and second flux providing logic output at the output means.

10. A magnetic ternary logic element, comprising in combination: a magnetizable core structure;

means integral with the core structure for providing a magnetic bias point on the flux-field hysterysis loop of the core structure, said core structure having two saturation levels on its flux-field hysterysis loop;

input means secured to the core structure for providing signal intelligence input to the logic element for producing a signal flux in the core structure and for shifting the magnetic bias point on the flux-field hysterysis loop, said input means and means integral with the core structure having a finite coefficient of coupling therebetween of a magnitude of less than 0.9; and output means secured to said core structure for providing logic outputs for said logic element in accordance to the signal intelligence, wherein the bias point is provided at the magnetic origin of the flux-field hysterysis loop of the core structure by virtue of the means for providing the bias point introducing two bias flux components in the core structure of equal magnitude and of opposite sense so as to positively lock the bias point at said magnetic origin, and the signal flux produces a shift of the bias point from said origin in accordance with the signal pulse polarity to a first of said saturation levels when the pulse is of a first polarity and to the second of said saturation levels when the pulse is of a second polarity opposite to the first polarity, the signal flux maintaining the bias point at the magnetic origin when pulses of the first and second polarities are simultaneously present due to cancellation of fluxes produced by the opposingly polarized pulses to provide zero output at the output means, the bias point being maintained at the magnetic origin when no said signal flux is present also providing a zero output at the output means, thereby resulting in three logic output stages at said output means.

11. The invention as stated in claim 10 being a ternary OR logic element:

the input means being at least two coils, each of said at least two coils being responsive respectively to individual intelligence signals which produce flux components in the core structure, each of the flux components individually being sufficient to provide a logic output at the output means.

12. The invention as stated in claim 10 being a ternary AND/OR logic element:

the input means being at least two coils, each of said at least two coils being responsive respectively to individual intelligence signals which produce flux components in the core structure the sum of which produce a first flux in the core structure and the presence of only one of said intelligence signals prevent production of said first flux; and the input means comprising at least another coil responsive to other signal intelligence input for producing a second flux in the core structure, the sum of the first and second flux providing logic output at the output means.

13. The invention as stated in claim 10 being a ternary AND logic element:

the input means being at least two coils, each of said at least two coils being responsive respectively to individual intelligence signals which produce flux components in the core structure the sum of which provide a logic output at the output means and the presence of only one of said intelligence signals producing no output at the output means.

14. The invention as stated in claim 10 being a voting logic element:

the input means being a plurality of coils, each of said plurality of coils being responsive respectively to individual intelligence signals which produce flux components in the core structure the sum of at least any two of the flux components providing a logic output at the output means, and the absence of said at least any two of the flux components results in absence of logic output at the output means.

15. The invention as stated in claim 10 being a voting logic element:

the input means being a plurality of coils, each of said plurality of coils being responsive respectively to individual intelligence signals which intelligence signals are polarized in any of two senses thereby producing corresponding signal flux components in any of two directions wherein at least two of the signal flux components having the same direction in the core structure provide a logic output at the output means; and the absence of said at least two of the signal flux components of the same direction, or the presence of said at least two the signal flux components wherein the algebraic sum of directions thereof results in less than two directions in magnitude irrespective of sense of said magnitude, results in no logic output at the output means.

16. The invention as stated in claim 10:

the bias point being located on the flux-field hysterysis loop away from either of the two saturation level locations; and the signal flux producing a shift of the bias point to either of the two saturation levels for providing a logic signal externally of said logic element.

17. The invention as stated in claim 16:

the bias point being located intermediate between the origin and one of the two saturation levels of the flux-field hysterysis loop.

18. The invention as stated in claim 16:

the bias point being located substantially at the magnetic origin of the flux-field hysterysis loop.

19. A magnetic ternary logic element, comprising in combination:

a magnetizable core structure having two saturation levels on its flux-field hysterysis loop;

means secured to said core structure for producing two bias flux components of equal magnitude and of opposite sense in the core structure for producing a bias point maintaining the core structure biased at the magnetic origin of said flux-field hysterysis loop;

output means secured to said core structure for providing three logic output states from said ternary logic element; and input means, comprising at least two inductive members having a finite coefficient of coupling therebetween of a magnitude of less than 0.9, secured to the core structure for providing signal pulse input to the logic element for shifting the bias point from the magnetic origin in accordance with the signal pulse polarity to a first of the two saturation levels when the signal pulse is polarized in a first sense, to a second of the two saturation levels when the signal pulse is polarized in a second sense opposite to the first sense, the signal pulse maintaining the bias point at the magnetic origin when the signal pulse constitutes two pulses of the first and second senses which are simultaneously present, the two pulses of the first and second senses cancelling each other to produce zero output at the output means, the bias point being maintained at the magnetic origin when no said signal pulse is present also providing a zero output at the output means, thereby resulting in said three logic output states at said outputs means.

20. A magnetic logic element, comprising:

a magnetizable core structure having coil means integral therewith for providing a first and a second main core flux interacting within said core structure, said coil means comprising at least two coils having a finite coefficient of coupling therebetween of a magnitude of less than 0.9, said logic element being capable of providing a plurality of logic states in excess of two, said coil means comprising first and second coils responsive to electrical input signal for producing a pair of first magnetic flux components of equal amplitude and opposite direction in said magnetizable core structure comprising said first main core flux for biasing said logic element at the magnetic origin of the flux-field hysterysis loop of said magnetizable core structure;

second coil means constituting at least one of a plural number of coils responsive to positive and negative electrical pulses for providing said second main core flux and for overcoming at least one of said first magnetic flux components and for shifting the bias point away from said magnetic origin; and third coils means of said coil means being responsive to said bias shift for selectively providing ternary logic output.

* * * * *

PO-1050
(5/69)

UNITED STATES PATENT OFFICE
CERTIFICATE OF CORRECTION

Patent No. 3,832,566 Dated August 27, 1974

Inventor(s) Martin E. Gerry

It is certified that error appears in the above-identified patent and that said Letters Patent are hereby corrected as shown below:

Claim 10, column 19, line 42 delete "stages", substitute therefor --states--

Claim 19, column 21, line 17 delete "outputs", substitute therefor --output--

Column 7, line 61 delete "$\phi_x$", substitue therefor --$\phi_w$--

Column 8, line 13 delete "$\phi_2$", substitute therefor --$\phi_{x2}$--

Column 10, lines 5-7 delete "having non-magnetic spacers 3 separating these portions 12, 13 and 14,"

Column 14, line 2 delete "ince", substitute therefor --since--

Signed and sealed this 29th day of October 1974.

(SEAL)
Attest:

McCOY M. GIBSON JR.
Attesting Officer

C. MARSHALL DANN
Commissioner of Patents